E. J. SCHRODER.
SIGNAL APPARATUS.
APPLICATION FILED MAR. 16, 1917.

1,260,817.

Patented Mar. 26, 1918.
2 SHEETS—SHEET 1.

Witness:
Harry S. Gaither

Inventor:
Edward J. Schroder
By Miller, Chrisdahl & Parker,
Attys

E. J. SCHRODER.
SIGNAL APPARATUS.
APPLICATION FILED MAR. 16, 1917.

1,260,817.

Patented Mar. 26, 1918.
2 SHEETS—SHEET 2.

Witness:
Harry S. Gaither

Inventor:
Edward J. Schroder
By Miller, Chindahl & Parker,
Attys

UNITED STATES PATENT OFFICE.

EDWARD J. SCHRODER, OF CHICAGO, ILLINOIS.

SIGNAL APPARATUS.

1,260,817.  Specification of Letters Patent.  Patented Mar. 26, 1918.

Application filed March 16, 1917. Serial No. 155,159.

*To all whom it may concern:*

Be it known that I, EDWARD J. SCHRODER, a citizen of the United States, residing at Chicago, in the county of Cook and State of Illinois, have invented certain new and useful Improvements in Signal Apparatus, of which the following is a specification.

This invention relates to signal apparatus intended to be mounted upon an automobile and designed to warn or signal the driver of a following vehicle.

Among the objects of the invention are to provide a light, compact, neat, and weatherproof apparatus adapted to serve the purpose of a tail-light and a slow-down warning for a following driver.

Figure 1:
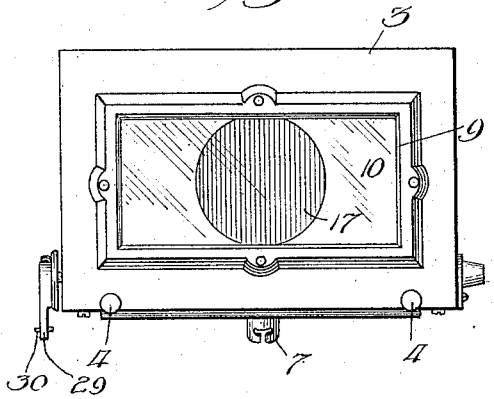
Figure 2:
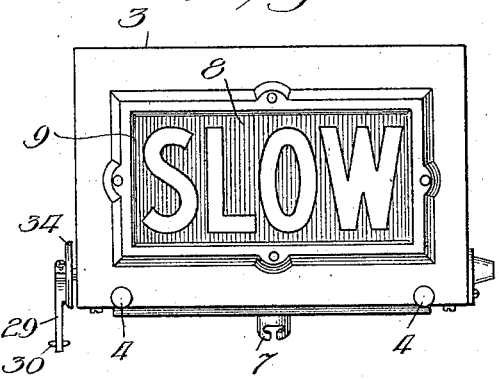
Figure 3:
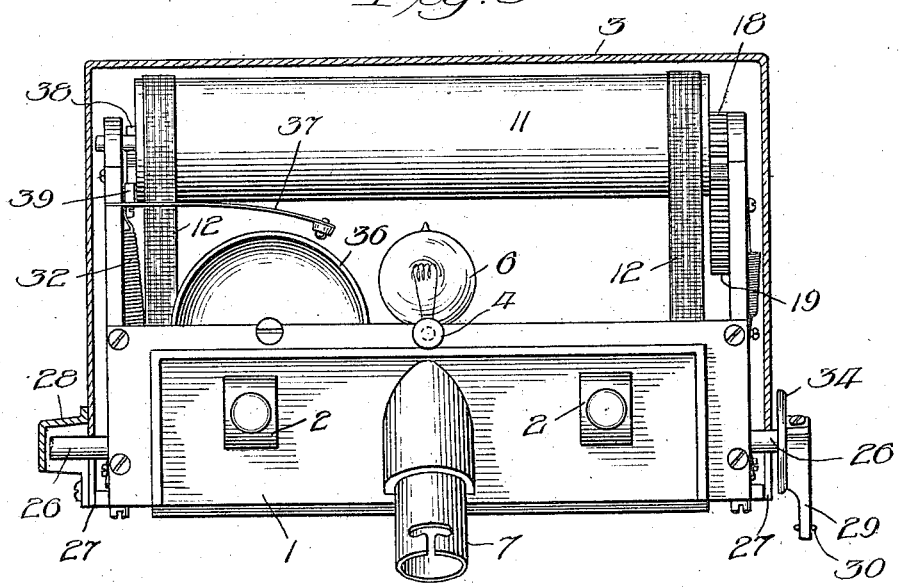
Figure 4:
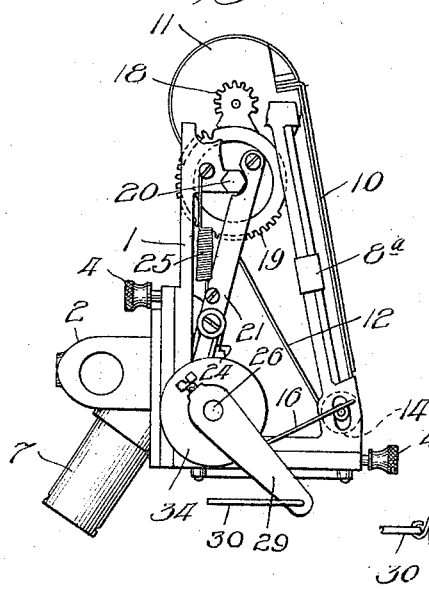
Figure 5:
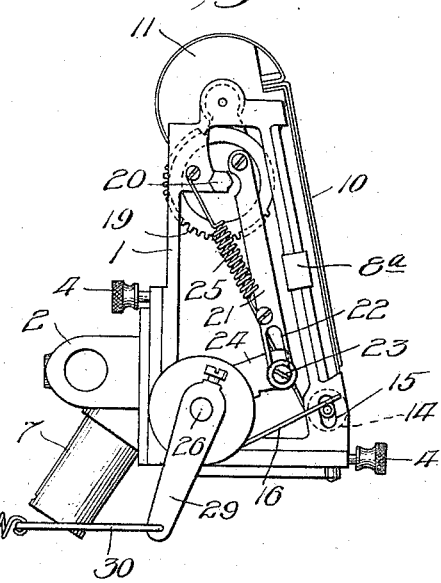
Figure 6:
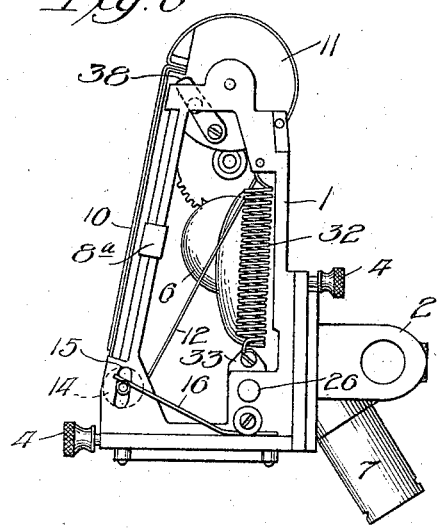
Figure 7:
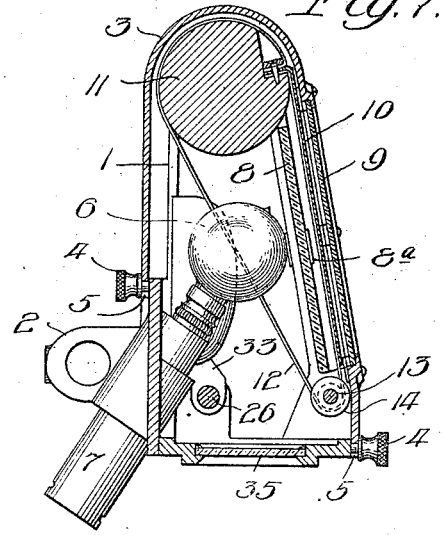
Figure 8:
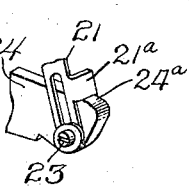

In the accompanying drawings, Figure 1 is a rear side elevation of an apparatus embodying the features of my invention, the parts being in position to serve the purpose of an ordinary tail-light. Fig. 2 is a similar view but showing the parts in position to warn a following driver that the car upon which the signal apparatus is mounted is about to change its speed or course. Fig. 3 is a front side elevation with the inclosing casing in section. Figs. 4 and 5 are end elevations with the casing removed showing the mechanism in different positions. Fig. 6 is an elevation of the opposite end of the apparatus with the casing removed. Fig. 7 is a transverse vertical sectional view. Fig. 8 is a detail view.

The embodiment herein shown of the invention comprises a supporting framework 1. While the apparatus may be attached to any suitable portion of the vehicle in any convenient manner, I have herein shown the supporting framework as provided upon its forward side with two perforated attaching lugs 2 by means of which the framework may be attached to a suitable portion of the body. The framework 1 is substantially entirely inclosed in a casing 3 which may be secured to the framework 1 in a suitable manner, as, for example, by means of thumb screws 4 fitting within notches 5 in the lower edges of the casing. It will be seen that by loosening the screws 4 the casing 3 is released and may be lifted off the framework 1.

Within the framework 1 is a lamp of any suitable character. Herein is shown an incandescent electric lamp 6 centrally located within the framework and having a socket 7 projecting downwardly from the lower portion of the forward side of the framework to receive a plug (not shown) attached to a flexible electric conductor.

Rearwardly of the lamp 6 is a device constructed and arranged to display to a following driver the word "Slow" or "Stop" or other desired signal. In the present embodiment such device consists of a glass plate 8 attached to the framework 1 by means of friction clips 8ª and painted to display the word "Slow". The casing 3 has a glazed sight opening 9 in its rear side through which the plate 8 may be seen by a following driver.

Means is provided to conceal the plate 8 and display through the sight opening 9 a warning light or the like. The means herein shown for this purpose comprises a curtain 10 supported for movement through the space between the glass plate 8 and the sight opening 9, said curtain being of sufficient size to obscure said plate. The curtain may be of any suitable material.

The upper edge of the curtain 10 is secured to a roller 11 journaled in the supporting framework 1. The curtain may be guided in any suitable manner. Herein the lower edge of the curtain is secured to two tapes or other suitable flexible connectors 12, said tapes also being attached to the roller 11. In the lower rear portion of the framework 1 is a rod or shaft 13 upon which are mounted grooved idler rollers 14 over which the tapes 12 extend. In order to hold the curtain 10 and tapes 12 under suitable tension, the ends of the shaft 13 may be mounted in slots 15 in the supporting framework so that said shaft is capable of movement toward and away from the roller 11. Springs 16 secured to the framework and bearing at their free ends against the ends of the shaft 13 hold the curtain 10 and the tape 12 under tension.

The curtain 10 is opaque save for the middle portion thereof which is preferably made translucent and colored to provide a circular red field through which the light from the lamp 6 may be transmitted. This field will be hereinafter referred to as the bull's eye 17.

The means for turning the roller 11 to move the curtain 10 into and out of position between the plate 8 and the sight opening 9 may be of any suitable construction. That herein shown comprises a pair of what may be termed intermittent gears 18 and 19 having teeth omitted from a substantial portion of their peripheries to permit a relative sliding movement of the gears during a part of their rotation, to the roller and the gear 19 being pivoted at 20 to the supporting framework. The upper end of a link 21 is pivoted to the gear wheel 19. In the lower end of said link is a longitudinal slot 22 through which extends freely a pin 23 carried by an arm 24. Upon the link 21 is a lug 21$^a$ adapted to overlie the rounded end 24$^a$ of the arm 24. A spring 25 connected at its ends to the supporting framework and the link 21 holds up the link 21 so that in the downward swing of the arm 24 the end 24$^a$ of said arm shall not press against the side of the lug 21$^a$. The arm 24 is fixed upon a rock shaft 26 which is journaled in the supporting framework. Both end portions of said shaft may, if desired, project beyond the ends of the supporting framework so that an actuating crank arm may be connected to either end of the shaft. The end walls of the casing 3 have notches 27 in their lower edges to fit over the shaft 26. One end of the casing carries a hood 28 to fit over the projecting end of the shaft 26 opposite to that upon which the actuating crank arm is located. Said crank arm is indicated at 29. It may be actuated through any suitable train of connections, as, for example, through a wire or cord 30 connected to one of the brake rods or to the brake pedal so that when the driver applies the brakes the curtain 10 is raised to disclose the warning appearing upon the glass plate 8.

The relative movement between the body carrying the framework 1 and the brake rigging due to uneven roads is compensated by the slot 22 and by the sliding of the intermittent gears 18 and 19 upon one another. Excess movement of the brake rod or pedal after the arm 29 has completed its working stroke is taken up in a spring 31 connected into the wire or cord 30.

A coiled tension spring 32 anchored at one end to the supporting framework and connected at its other end to an arm 33 on the shaft 26 serves to restore the mechanism of the signal apparatus to normal position when the brakes are released.

When the driver applies the brakes, the arm 24 swings down until the pin 23 engages the lower end wall of the slot 22, the spring 25 in the meantime holding the link up so that the end of the arm 24 shall clear the lug 21$^a$. Continuing downward movement of the arm 24 pulls the link down and causes a quick rise of the curtain 10. When the brakes are released, the spring 32 raises the arm 24, the rounded end 24$^a$ of said arm immediately pushing against the lower edge of the lug 21$^a$ and thus positively lowering the curtain during the early part of the upward swing of the arm.

The hub of the crank arm 29 may be provided with a disk 34 to overlie the notch 27 in the adjacent end wall of the casing 3.

In the lower side of the framework 1 is a glazed opening 35 through which the light from the lamp 6 is projected downwardly to illuminate the license number plate (not shown).

If desired, a signal may be provided to indicate to the driver of the vehicle that the apparatus is in working order. Herein is shown a bell 36, the striker 37 of which is arranged to be actuated through contact of a projection 38 on the roller 11 with a lug 39 on said striker.

The operation is as follows: When the driver of the vehicle applies the brakes in changing his course or speed, the curtain 10 is raised to disclose to any following driver the word "Slow." In the day time said word may be read by means of reflected sunlight. At night, the word is rendered visible through the light of the lamp shining through the glass plate 8. When the brakes are released the curtain 10 resumes its normal position, as shown in Figs. 1 and 7, wherein the word "Slow" is covered. At night, the light of the lamp 6 shines through the plate 8 and through the translucent bull's eye 17, the apparatus then serving as an ordinary tail-light. Whenever the brakes are applied the bell 36 rings, thus indicating to the driver of the vehicle that the signal is operating properly. If the mechanism or actuating connections should break, the driver will become aware of the fact through failure of the bell to ring. The bell also gives warning to a following driver in case he is not watching for a visual signal.

It will be noted that the apparatus is self-contained and is effectively inclosed so as not to be affected by rain, snow or mud. As will be apparent from Fig. 7, the plate 8 is inclined in order that a following driver may the more readily read the signal. The cover 3 can be removed without disturbing any of the mechanism. When it is desired to renew the lamp 6, the cover 3 may be removed whereupon the lamp may be removed through the forward side of the framework 1. If, however, access cannot be had at the front side of the framework, the brakes may be set so as to raise the curtain; the casing 3 may then be released and lifted off, and the clamps 8$^a$ and the glass plate 8 removed. Access may then be had to the lamp through the rear side of the apparatus.

I claim as my invention:

1. In a signal apparatus, in combination, a transparent sign plate, a lamp at one side thereof, a curtain at the opposite side thereof, having a translucent signal portion, said curtain being movable to one position to expose the sign and to another position to conceal the sign and expose the translucent portion of the curtain, said portion being illuminated by light passing through the sign plate.

2. A signal apparatus comprising a casing, a roller rotatably mounted in the upper portion of the casing, a shaft mounted in the lower portion of the casing, means tending to move the shaft laterally away from the roller, a flexible opaque curtain connected at its upper edge to the roller, two tapes each connected at one end to the lower edge of the curtain and at their opposite ends to the roller, idler rollers on said shaft around which said tapes extend, a lamp mounted centrally within the casing and directly below the roller, a signal device located between the lamp and the curtain, said curtain having a translucent portion arranged to occupy a position behind and in alinement with the lamp when the curtain is in rear of the signal device, and means for turning the roller to reciprocate the curtain into and out of position to conceal the signal device, said casing having a glazed sight opening in its rear wall.

3. A signal apparatus comprising a casing, a lamp in the casing, a signal device arranged to be illuminated by the lamp, a roller mounted in the casing, an opaque curtain attached to said roller, means for guiding the curtain to move into and out of position to cover said signal device in the rotation of the roller, intermittent gearing for turning the roller, a shaft supported in the casing, a crank arm on the shaft, a link connecting said crank arm to one of the intermittent gears, said link and crank arm having a lost-motion connection, and means for turning said shaft.

4. A signal apparatus comprising a casing, a roller rotatably mounted in the upper portion of the casing, a flexible opaque curtain connected at its upper edge to the roller, two tapes each connected at one end to the lower edge of the curtain and at their opposite ends to the roller, idler rollers in the lower part of the casing around which said tapes extend, a lamp mounted centrally within the casing and directly below the roller, a signal device located between the lamp and the curtain, and means for turning the roller to reciprocate the curtain into and out of position to conceal the signal device, said casing having a glazed sight opening in its rear wall.

5. A signal apparatus including a casing having a sight opening, a lamp for illuminating the casing, a signal device arranged to be illuminated by the lamp, an opaque member having a translucent bull's eye normally registering with the sight opening, means for moving said member to expose the signal device, and means for indicating when the signal device has been exposed.

6. A signal apparatus comprising a roller, a curtain attached to said roller, gearing for turning the roller, a shaft supported in the casing, a crank arm on the shaft, a pin on the crank arm, a link pivoted to one of the gears and having a slot through which said pin extends, a lug on said link, said crank arm having a rounded end arranged to engage said lug when the arm swings in one direction, and a spring acting on said link to hold said lug clear of said arm when the arm swings in the other direction.

7. A signal apparatus comprising a roller, a curtain attached to said roller, a shaft supported in the casing, a crank arm on the shaft, a pin on the crank arm, a link operatively connected to turn the roller, said link having a slot through which said pin extends, a lug on said link, said crank arm being arranged to engage said lug when the arm swings in one direction, and a spring acting on said link to hold said lug clear of said arm when the arm swings in the other direction.

In testimony whereof, I have hereunto set my hand.

EDWARD J. SCHRODER.

Copies of this patent may be obtained for five cents each, by addressing the "Commissioner of Patents, Washington, D. C."